United States Patent
Morioka et al.

(10) Patent No.: US 8,276,054 B2
(45) Date of Patent: Sep. 25, 2012

(54) WIRELESS COMMUNICATION SYSTEM, WIRELESS COMMUNICATION APPARATUS, WIRELESS COMMUNICATION METHOD, AND COMPUTER PROGRAM

(75) Inventors: Yuichi Morioka, Tokyo (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 1259 days.

(21) Appl. No.: 11/765,544

(22) Filed: Jun. 20, 2007

(65) Prior Publication Data
US 2008/0109711 A1    May 8, 2008

(30) Foreign Application Priority Data
Jun. 27, 2006    (JP) .................. 2006-176094

(51) Int. Cl.
*H03M 13/09* (2006.01)
*H04L 1/00* (2006.01)
(52) U.S. Cl. ........................ 714/798; 714/811
(58) Field of Classification Search .................. 714/798, 714/811
See application file for complete search history.

(56) References Cited

U.S. PATENT DOCUMENTS

| | | | |
|---|---|---|---|
| 6,888,844 B2 * | 5/2005 | Mallory et al. | 370/466 |
| 7,062,703 B1 * | 6/2006 | Keaney et al. | 714/807 |
| 7,548,559 B2 * | 6/2009 | Aarnio | 370/469 |
| 7,551,581 B2 * | 6/2009 | Stephens et al. | 370/329 |
| 7,680,150 B2 * | 3/2010 | Liu et al. | 370/469 |
| 7,706,408 B2 * | 4/2010 | Takagi et al. | 370/473 |
| 7,760,700 B2 * | 7/2010 | Frederiks et al. | 370/347 |
| 7,817,614 B2 * | 10/2010 | Yang et al. | 370/346 |

FOREIGN PATENT DOCUMENTS

JP    2006-50526    2/2006

* cited by examiner

*Primary Examiner* — Stephen Baker
(74) *Attorney, Agent, or Firm* — Finnegan, Henderson, Farabow, Garrett & Dunner, L.L.P.

(57) ABSTRACT

A wireless communication system includes a first communication station configured to operate according to a first communication protocol, and a second communication station capable of operating according to both the first communication protocol and a second communication protocol. When the second communication station transmits a packet according to the second communication protocol, at least a first signal field compliant with the first communication protocol and a second signal field compliant with the second communication protocol are attached to a header of the packet, and the first signal field includes a parity bit. When the second communication station receives a packet from another communication station, the second communication station performs a parity check on the first signal field of the packet, and when no parity error is detected, the second communication station further checks whether content of the first signal field is compliant with the first communication protocol.

24 Claims, 12 Drawing Sheets

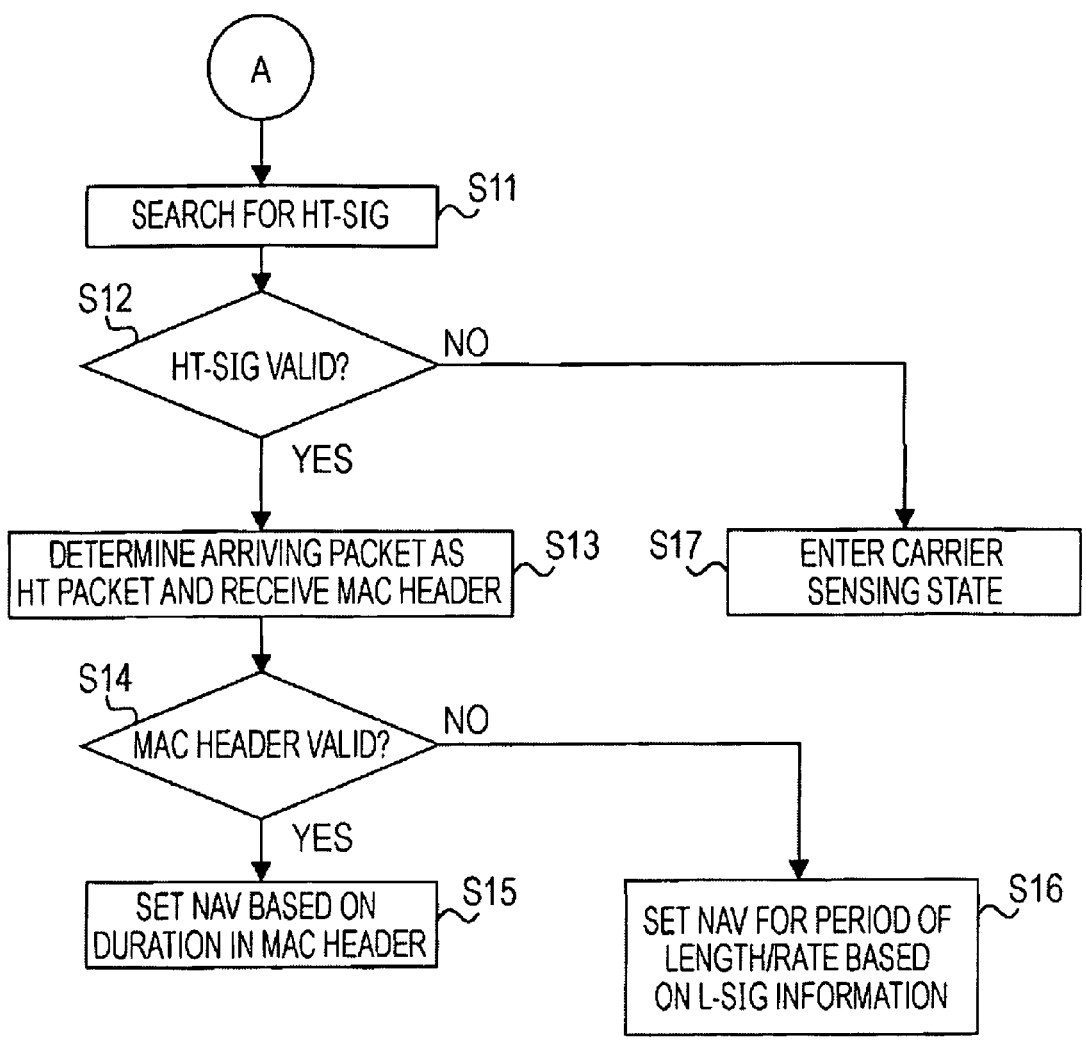

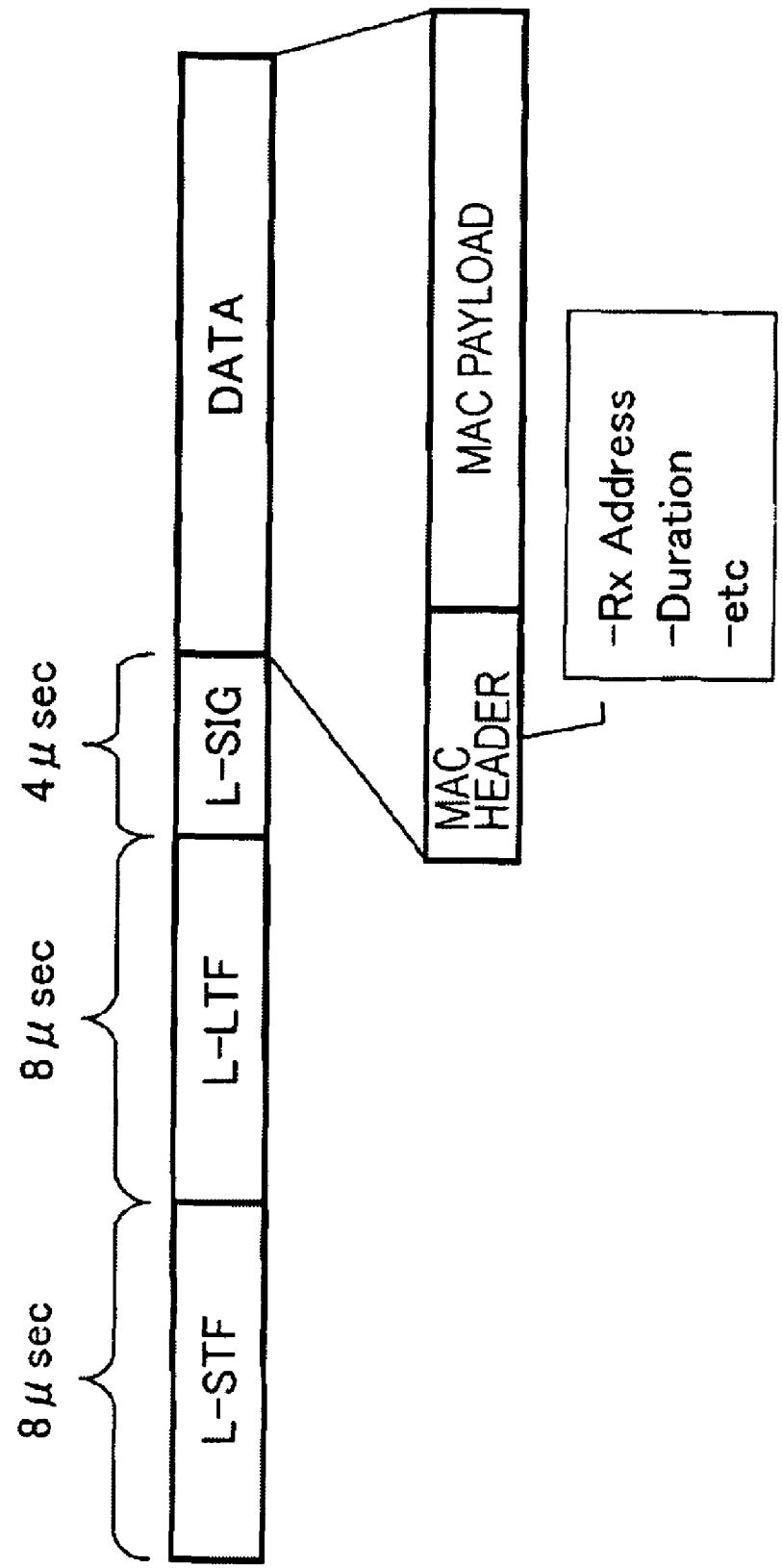

FIG. 6

| RATE (4 BITS) | | | | R | | | LENGTH (12 BITS) | | | | | | | | | | P | TAIL (6 BITS) | | | | | |
|---|---|---|---|---|---|---|---|---|---|---|---|---|---|---|---|---|---|---|---|---|---|---|---|
| R1 | R2 | R3 | R4 | | | | | | | | | | | | | | | "0" | "0" | "0" | "0" | "0" | "0" |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

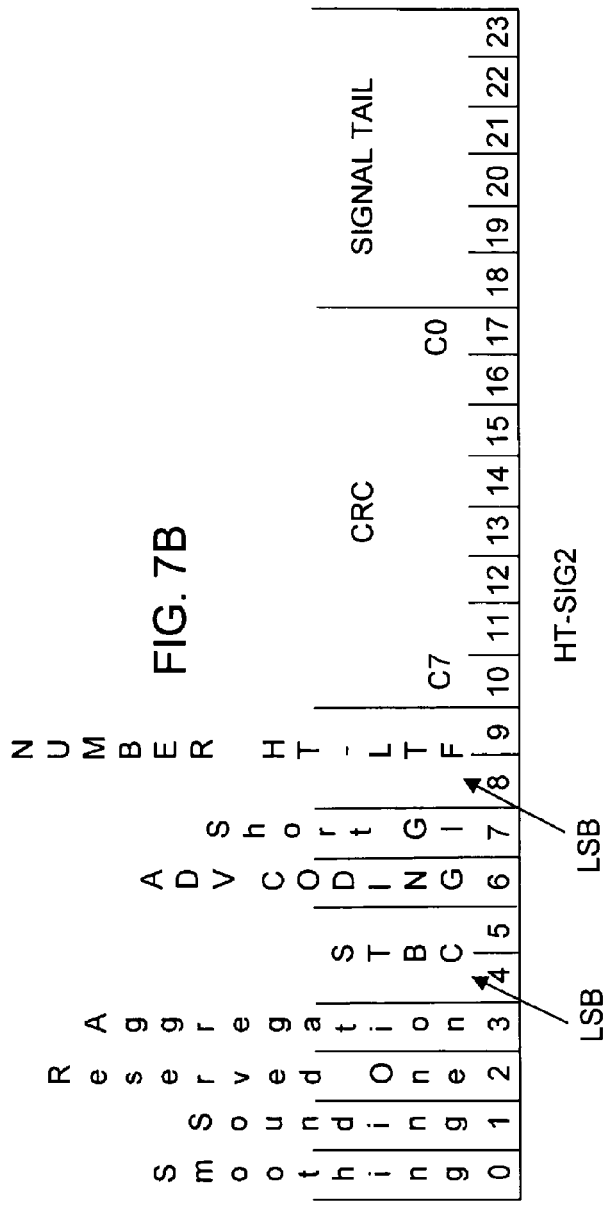

WIRELESS COMMUNICATION SYSTEM, WIRELESS COMMUNICATION APPARATUS, WIRELESS COMMUNICATION METHOD, AND COMPUTER PROGRAM

CROSS REFERENCES TO RELATED APPLICATIONS

The present invention contains subject matter related to Japanese Patent Application JP 2006-176094 filed in the Japanese Patent Office on Jun. 27, 2006, the entire contents of which are incorporated herein by reference.

BACKGROUND OF THE INVENTION

1. Field of the Invention

The present invention relates to wireless communication systems, wireless communication apparatuses, wireless communication methods, and computer programs for carrying out communications mutually among a plurality of wireless stations in a wireless local area network (LAN), a wireless personal area network (PAN), or the like. For example, the present invention relates to a wireless communication system, a wireless communication apparatus, a wireless communication method, and a computer program for carrying out communications according to the IEEE 802.11n while maintaining compatibility with the IEEE 802.11a/g.

More specifically, the present invention relates to wireless communication systems, wireless communication apparatuses, wireless communication methods, and computer programs for executing a packet exchanging sequence correctly on the basis of information included in preambles. Particularly, the present invention relates to a wireless communication system, a wireless communication apparatus, a wireless communication method, and a computer program that are robust against parity errors that occur in SIGNAL fields in preambles representing transmission rate, data length, etc.

2. Description of the Related Art

There exist increasing interests in wireless networks, which are free of wires used in wired communication systems. Examples of standards for wireless networks include the IEEE (the Institute of Electrical and Electronics Engineers) 802.11 or the IEEE 802.15.

For example, the IEEE 802.11a/g, which is a standard protocol for wireless LANs, employs orthogonal frequency division multiplexing (OFDM), which is a type of muiticarrier modulation. With OFDM, transmission data is carried on a plurality of carriers having mutually orthogonal frequencies. Thus, the bandwidth of each of the carriers is narrow, so that frequencies can be used efficiently, and robustness against frequency-selective fading is high.

The IEEE 802.11a/g supports a modulation scheme that allows a maximum communication rate of 54 Mbps. However, there exists a demand for a next-generation LAN standard that allows an even higher bitrate. For example, the IEEE 802.11n, which is an extended version of the IEEE 802.11a/g, aims at developing high-speed wireless LAN technologies that can achieve an effective throughput exceeding 100 Mbps by employing multi-input multi-output (MIMO) communications.

Furthermore, the PHY layer of the IEEE 802.11n defines a high-throughput (HT) transmission mode (hereinafter referred to as the "HT mode") with a modulation and coding scheme (MCS) totally different from that of the IEEE 802.11a/g, as well as an operation mode in which data is transmitted with the same packet format and using the same frequency range as in the IEEE 802.11a/g (hereinafter referred to as the "legacy mode"). Furthermore, as a mode in the HT mode, an operation mode called the "mixed mode (MM)", having compatibility with terminals compliant with the IEEE 802.11a/g (hereinafter referred to as "legacy terminals"), is defined. The mixed mode is described, for example, in the EWC (Enhanced Wireless Consortium) PHY Specification. The IEEE 802.11n requires support of the mixed mode (MM).

FIGS. 4 and 5 show packet formats in the legacy mode and the MM mode, respectively. In FIGS. 4 and 5, the duration of each OFDM symbol is 4 microseconds.

Referring to FIG. 4, the packet in the legacy mode (hereinafter referred to as a "legacy packet") has the same format as a packet according to the IEEE 802.11a/g. A header of the legacy packet includes a legacy short training field (L-STF) containing known OFDM symbols for packet discovery, a legacy long training field (L-LTF) containing known training symbols for synchronization acquisition and equalization, and a legacy signal field (L-SIG) as a SIGNAL field representing a transmission rate, a data length, etc. The head is followed by a payload (DATA field).

On the other hand, the packet shown in FIG. 5 (hereinafter referred to as an "MM packet") includes a legacy preamble having the same format as a preamble according to the IEEE 802.11a/g, a preamble defined by the IEEE 802.11n (hereinafter referred to as an "HT preamble"), and a data portion. The HT preamble and the data portion (shaded in FIG. 5) have an HT format, with which a communication scheme specific to the IEEE 802.11n is used.

The HT preamble includes HT-SIG, HT-STF, and HT-LTF. The HT-SIG is a SIGNAL field that is used in HT transmission in the MM mode. The HT-SIG includes information used to interpret the HT format, such as an MCS used for the PHY payload (PSDU) and the payload data length. The HT-STF contains training symbols for facilitating automatic gain control (AGC) in an MIMO system. The HT-LTF contains training symbols for executing channel estimation at a receiver for each input signal that is spatially modulated (mapped).

In the case of MIMO communications, in which two or more transmission branches are used, at a receiver, a channel matrix is obtained by estimating channel coefficients for each combination of transmission and reception antennas that spatially separate received signals. Thus, at a transmitter, HT-LTFs are transmitted from transmission antennas by time division, and one or more HT-LTF fields are added in accordance with the number of spatial streams.

The legacy preamble in the MM packet have the same format as the preamble in the legacy packet, and is transmitted in a format that can be decoded by legacy terminals. On the other hand, the HT format portion beginning with the HT preamble is transmitted in a transmission scheme not supported by legacy terminals. A legacy terminal decodes the L-SIG in the legacy preamble in the MM packet, finds that the packet is not addressed to the own terminal and reads data length information and so forth, and sets a network allocation vector (NAV) with an appropriate length, i.e., a transmission waiting period, thereby avoiding collision. As a result, the MM packet is compatible with legacy terminals.

A SIGNAL field in the preamble of a packet is a field describing information regarding the transmission rate and data length of the packet. In the legacy mode, an actual value is described in the L-SIG. On the other hand, in the MM mode, an actual value is described in the HT-SIG. FIG. 6 and FIGS. 7A and 7B show the formats of the L-SIG and HT-SIG fields.

In a packet transmitted in the legacy mode by an HT terminal compliant with the IEEE 802.11n (EWC), the L-SIG field is transmitted with the same definition and scheme as described in Section 17.3.4 of the IEEE 802.11a standard. On the other hand, the legacy preamble of the MM packet transmitted is the legacy mode is compatible with legacy terminals. Thus, it is not allowed to describe the actual (high-speed) transmission rate, which is not supported in the legacy mode. The L-SIG field is used to spoof the transmission rate (RATE) and the packet length (LENGTH) information to legacy terminals. More specifically, in the L-SIG, the RATE field contains a bit sequence representing 6 Mbps, which is compatible with legacy terminals, and the LENGTH field contains a value defining an appropriate network allocation vector (NAV) instead of an actual data length. That is, packet-length information is spoofed in the L-SIG determined in accordance with the transmission rate so that the value obtained by dividing the packet length by the transmission rate becomes equal to a desired duration for which communications are to be refrained.

Upon receiving an MM packet, a legacy terminal sets an NAV for a period of a duration that is determined by dividing the spoofed packet length by the transmission rate on the basis of the L-SIG field of the packet, and refrains from transmission during this period. Thus, collision with the MM packet is avoided, so that the packet exchanging sequence can be maintained.

Furthermore, among HT terminals, MM packets are mutually recognized in such a manner the HT terminals do not recognize that the transmission rate and packet length in the L-SIG field are spoofed to legacy terminals, so that the legacy terminals operate as specified in the L-SIG field. Thus, the HT-SIG is transmitted in such a scheme that the HT-SIG can be decoded by all HT terminals but will not be decoded by legacy terminals. More specifically, the HT-SIG field is BPSK-modulated (refer to FIGS. 8A and 8B) in a phase space that is rotated by 30 degrees relative to a phase space for the L-SIG field (or preceding or succeeding field). Upon detecting a packet, an HT terminal at a receiving end checks whether the absolute phase space of the fifth OFDM symbol is rotated by 90 degrees. When the phase of the symbol is rotated by 90 degrees, the HT terminal can determine that the field is an HT-SIG field and that the packet is an MM packet. This is described, for example, in Japanese Unexamined Patent Application Publication No. 2006-50526, paragraphs 0142 to 0147 and FIG. 15. Furthermore, similarly to a legacy terminal, the HT terminal calculates a period of NAV on the basis of the content of the L-SIG field and refrains from transmission during the period, so that the packet exchanging sequence can be maintained.

Referring to the format of the L-SIG field shown in FIG. 6, regarding error detection, only one bit at the 18th bit, which functions as a parity bit, is provided. In this case, errors that occur at an even number of bits are not detected (refer to FIG. 9), so that communications are susceptible to parity errors.

When errors that have occurred are not detected so that a NAV is set for a wrong period calculated on the basis of the incorrect RATE information and LENGTH information in the L-SIG field, the system throughput is reduced if transmission is refrained unnecessarily.

In the case of an HT packet, even when a parity error occurs in the L-SIG field, in some cases, it is possible to discard all the received data in the field and to recover a normal communication sequence on the basis of the content of the succeeding HT-SIG field or MAC header. However, such a chance of recovery might be missed when errors that occur at an even number of bits are not detected.

SUMMARY OF THE INVENTION

There exists a demand, for a favorable wireless communication system, wireless communication apparatus, wireless communication method, and computer program that allow communications appropriately according to the IEEE 802.11n while maintaining compatibility with the IEEE 802.11a/g.

There also exists a demand for a favorable wireless communication system, wireless communication apparatus, wireless communication method, and computer program that allow executing a packet exchanging sequence correctly on the basis of information included in preambles.

There also exists a demand for a favorable wireless communication system, wireless communication apparatus, wireless communication method, and computer program that are robust against parity errors that occur in SIGNAL fields representing information such as a transmission rate, a data length, etc. in preambles.

According to an embodiment of the present, invention, there is provided a wireless communication system including a first communication station configured to operate according to a first communication protocol; and a second communication station capable of operating according to both the first communication protocol and a second communication protocol. When the second communication station transmits a packet according to the second communication protocol, at least a first signal field compliant with the first communication protocol and a second signal field compliant with the second communication protocol are attached to a header of the packet, the first signal field including a parity bit. When the second communication station receives a packet from another communication station, the second communication station performs a parity check on the first signal field of the packet, and when no parity error is detected, the second communication station further checks whether content of the first signal field is compliant with the first communication protocol.

A "system" herein refers to a logical combination of a plurality of apparatuses (or functional modules that execute specific functions), regardless of whether the individual apparatuses or functional, modules are provided within a single case. This applies hereinafter throughout this specification.

In the wireless communication system, while maintaining compatibility with the first communication protocol, e.g., the IEEE 802.11a/g, a wireless communication apparatus carries out communications according to the second communication protocol, e.g., the IEEE 802.11n. The first communication protocol corresponds to a legacy standard, and the second communication protocol corresponds to an enhanced or extended version thereof.

In a wireless communication system of this type, a header of a packet includes a legacy preamble having the same format as the format of a preamble according to the IEEE 802.11a/g. Although a legacy terminal is not able to decode a portion transmitted in the HT format, a packet exchanging sequence can be executed appropriately on the basis of the content of the legacy preamble. That is, it is possible to maintain compatibility between a legacy terminal as the first communication station and an HT terminal as the second communication station.

However, in the L-SIG, i.e., the SIGNAL field including information such as a data transmission rate and a data length in the legacy preamble, only one bit is provided for error detection. Thus, communications are susceptible to parity errors since errors that occur at an even number of bits are not detected.

Thus, in the wireless communication system, the HT terminal as the second communication station includes detecting means for detecting whether the content of the L-SIG (i.e., the first signal field according to the first communication protocol) is complaint. When information included in the L-SIG is not compliant, even when no parity error is detected, the information read from the L-SIG is considered as invalid and is discarded. This serves to improve the accuracy of error detection in the L-SIG.

For example, the LENGTH field in the L-SIG has a length of 12 bits, and can take on a value up to 4,096 bytes. On the other hand, the maximum packet length defined by the legacy standard IEEE 802.11a/g is 2,346 bytes. Thus, when the value in the LENGTH field exceeds 2,346 bytes, it can be estimated that an error is included in the field.

The RATE field in the L-SIG has a length of 4 bits, and can take on 16 possible values. On the other hand, the IEEE 802.11a/g defines 8 possible transmission rates. Thus, when the RATE fields includes a bit sequence representing one of the non-compliant 8 transmission rates not corresponding to the compliant 8 transmission rates, it can be estimated that an error is included in the field.

The last 6 bits of the L-SIG field is a TAIL field composed of a sequence of 0s and indicating the end of the L-SIG field. Thus, when a value other than 0 is included in the field, it can be estimated that an error is included in the field.

A rule specific to the second communication protocol may be defined regarding content of the first signal field of a packet that is transmitted according to the second communication protocol, the rule being defined so as not to be incompatible with the first communication protocol. In this case, when the second communication station receives a packet from another communication station, the second communication station checks whether content of the first signal field is compliant with the rule specific to the second communication protocol. This serves to detect errors that are not detected by the parity check.

More specifically, for example, in the IEEE 802.11n, regarding the content of the L-SIG in the legacy preamble, a certain rule that is not incompatible with the IEEE 802.11n is defined. When an HT packet is received, an HT terminal as the second communication station checks whether the content of the L-SIG is compliant with this rule. When the L-SIG is not compliant with the rule, even when no parity error is detected, the information read from the L-SIG is considered as invalid and is discarded.

For example, the IEEE 802.11n defines that "1101 representing 6 Mbps be set in the RATE field in the L-SIG of the legacy preamble of an HT packet. Thus, when the RATE field in the L-SIG of an MM packet includes a bit sequence other than "1101", it can be estimated that an error is included in the field.

The IEEE 802.11a defines that the number of bytes that can be transmitted per unit time is uniquely determined according to the transmission rate. More specifically, when the transmission rate is 6 Mbps, the number of bytes that can be transmitted per each OFDM symbol is 3 bytes. In this case, in the range of packet length from 3N+1 bytes to 3 (N+1) bytes, the number of OFDM symbols used for transmission is the same N+1. Thus, the duration corresponding to a value obtained by dividing the value of the LENGTH field by the value of the RATE field is the same.

Thus, by defining that the value of the LENGTH field be a multiple of 3 bytes, it possible to determine whether an error is included in the LENGTH field by checking whether the value of the LENGTH field is a multiple of 3 bytes. Alternatively, by defining that the value of the LENGTH field be a value compliant with a rule shared between a transmitting communication station and a receiving communication station, such as a multiple of 3 bytes+1 or a multiple of 3 bytes+2, similarly, it is possible to check whether an error is included by checking the value of the LENGTH field.

As described above, with the wireless communication system, when the second communication station receives a packet, compliance with the legacy standard IEEE 802.11a and compliance with the enhanced standard IEEE 802.11n are checked regarding the values of the RATE field and the LENGTH field in the L-SIG. This serves to detect errors in the L-SIG that are not detected by the parity check.

Furthermore, the second communication terminal can receive a MAC frame adoptively according to either the first communication protocol or the second communication protocol in accordance with a result of checking the first signal field of the received packet or a result of detecting whether a valid second signal field exists.

For example, the packet analyzing means includes detecting means for detecting whether a valid second signal field exists after the first signal field of the received packet. In this case, the communication controlling means can receive a MAC frame adaptively according to either the first communication protocol or the second communication protocol in accordance with a result of checking the first signal field of the received packet and a result of detecting whether a valid second signal field exists by the packet analyzing means.

When the checking of the first signal field of the received packet by the packet analyzing means succeeds, the communication controlling means may control reception of a MAC frame according to the second communication protocol when a valid second signal field is received, and otherwise control reception of a MAC frame according to the first communication protocol.

Even when the checking of the first signal field of the received packet by the packet analyzing means fails, the communication controlling means may attempt to receive a second signal field, and control reception of a MAC frame according to the second communication protocol when a valid second signal field is received.

When the checking of the first signal field of the received packet by the packet analyzing means fails or when the checking of the first signal field of the received packet by the packet analyzing means fails and a valid second signal field is not received, since the reliability of the received packet is very low, the communication controlling means may cause the transmitting means and the receiving means to enter a carrier detecting state.

When a rule specific to the second communication protocol is defined regarding content of the first signal field of a packet that is transmitted according to the second communication protocol, the rule being defined so as not to be incompatible with the first communication protocol, when the content of the first signal field is not compliant with the rule specific to the second communication protocol as a result of checking the received packet by the packet analyzing means, the communication controlling means may control reception of a MAC frame according to the first communication protocol. Alternatively, even when the content of the first signal field is not compliant with the rule specific to the second communication protocol as a result of checking the received packet by the packet analyzing means, the communication controlling means may attempt to receive a second signal field, and control reception of a MAC frame according to the second communication protocol when a valid second signal field is received.

Furthermore, even when a valid second signal field is received, when a valid MAC frame is not received subsequently, the communication controlling means may set a transmission waiting period on the basis of the value obtained by dividing the value of the length field by the value of the rate field in the first signal field. In this case, a wireless communication apparatus that operates as the second communication station sets a NAV for the transmission waiting period determined by dividing the value of the length field by the value of the rate field on the basis of information in the L-SIG instead of the duration information in the MAC header, and refrains from transmission during the transmission waiting period. Since the possibility of errors in the L-SIG field is reduced, the transmission waiting period can be determined more appropriately.

According to another embodiment of the present invention, there is provided a computer program written in a computer-readable form so that a computer is allowed to execute processing for carrying out communications in a wireless communication environment in which a first communication protocol and a second communication protocol are used. The computer program allows the computer to execute the steps of generating a packet having a header to which a first signal field according to the first communication protocol is attached, the first signal field including a parity bit, and transmitting the packet according to the first communication protocol; generating a packet having a header to which a first signal field according to the first communication protocol and a second signal field according to the second communication protocol are attached, the first signal field including a parity bit, and transmitting the packet according to the second communication protocol; receiving a packet from another communication station; performing a parity check on the first signal field of the received packet, and when no parity error is detected, further checking whether content of the first signal field is compliant with the first communication protocol; detecting whether a valid second signal field exists subsequently to the first signal field of the received packet; and receiving a frame subsequent to a signal field according to either the first communication protocol or the second communication protocol in accordance with a result of checking the first signal field of the received packet or a result of detecting whether a valid second signal field exists.

The computer program defines a computer program written in a computer-readable form to allow a computer to execute predetermined processing. That is, by installing the computer program on a computer, in cooperation with the computer program, the computer can operate as the second communication station, i.e., a wireless communication apparatus that is compatible with both the first and second communication protocols in the wireless communication system described earlier. By forming a wireless network by activating a plurality of wireless communication apparatuses of this type, the same operation and advantages can be achieved as in the case of the wireless communication system described earlier.

According to these embodiments of the present invention, it is possible to provide a favorable wireless communication system, wireless communication apparatus, wireless communication method, and computer program that allow communications appropriately according to the IEEE 802.11n while maintaining compatibility with the IEEE 802.11a/g.

Furthermore, according to these embodiments of the present invention, it is possible to provide a favorable wireless communication system, wireless communication apparatus, wireless communication method, and computer program that allow executing a packet exchanging sequence correctly on the basis of information included in preambles.

Furthermore, according to these embodiments of the present invention, it is possible to provide a favorable wireless communication system, wireless communication apparatus, wireless communication method, and computer program that are robust against parity errors that occur in SIGNAL fields representing information such as a transmission rate, a data length, etc. in preambles.

Further objects, features, and advantages of the present invention will be understood from more detailed description of the following description of embodiments with reference to the accompanying drawings.

BRIEF DESCRIPTION OF THE DRAWINGS

FIG. 2B is a flowchart showing a procedure by which an HT terminal compliant with the IEEE 802.11n receives a packet while checking errors in an L-SIG field;

FIG. 4 is a diagram showing the format of a legacy packet;

FIG. 6 is a diagram showing the data structure of an L-SIG field;

FIG. 7A is a diagram showing the data structure of an HT-SIG field;

FIG. 7B is a diagram showing the data structure of an HT-SIG field;

DESCRIPTION OF THE PREFERRED EMBODIMENTS

Now, embodiments of the present invention will be described in detail with reference to the drawings.

The present invention relates to communications over wireless transmission paths in a network including a plurality of communication stations. Furthermore, the present invention assumes store-and-forward traffic in which information is transferred in packets. As an example, in a communication environment assumed in an embodiment of the present invention, legacy terminals compliant with the IEEE 802.11a/g and HT terminals compliant with the IEEE 802.11n, which is a high-throughput (HT) version that uses the same band, are allowed to operate.

Figure 1:
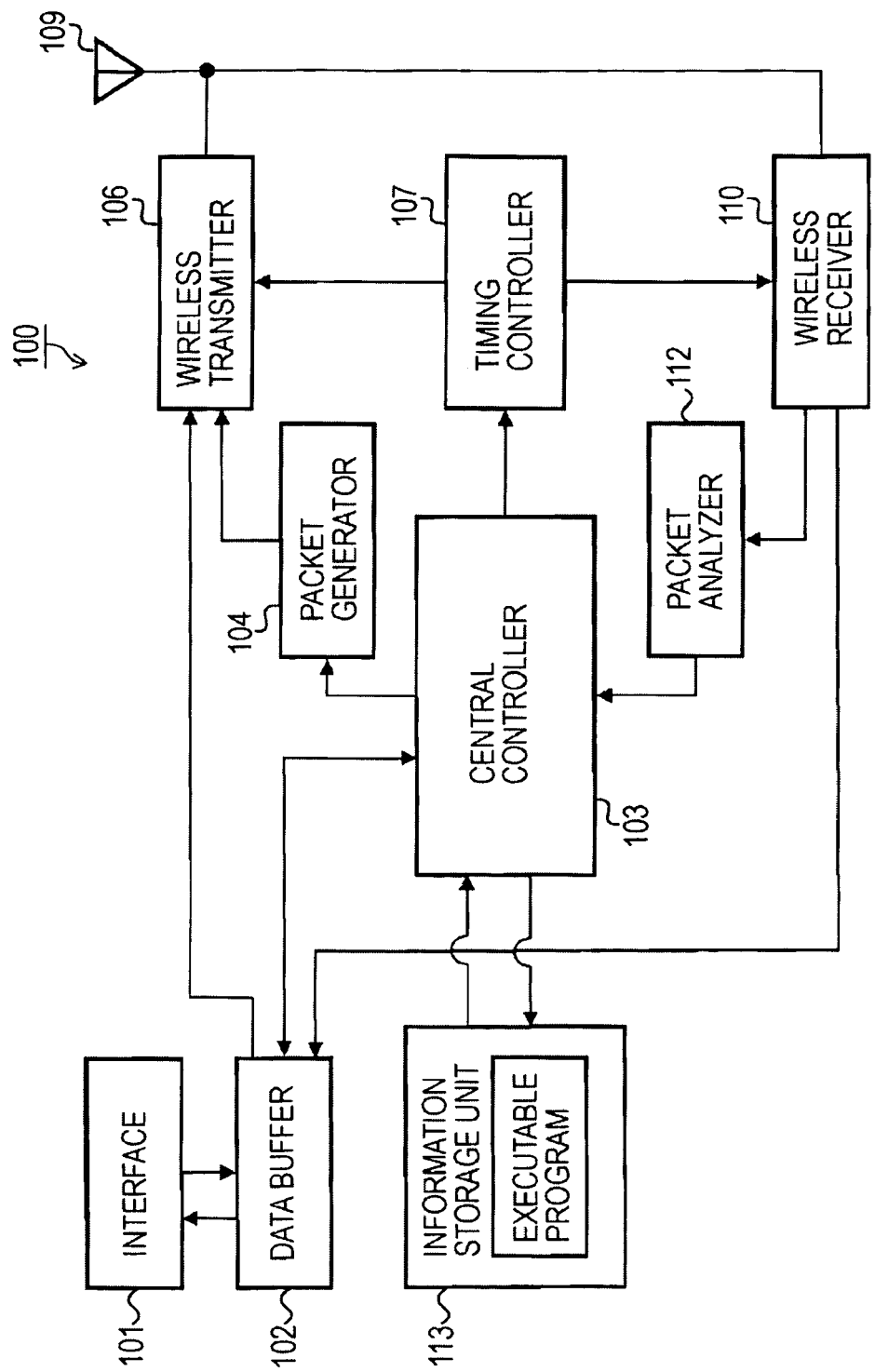
FIG. 1 is a schematic diagram showing the functional configuration of a wireless communication apparatus that operates as a communication station in a wireless network in an embodiment of the present invention.

FIG. 1 schematically shows the functional configuration of a wireless communication apparatus that operates as a communication terminal in a wireless network in an embodiment of the present invention. Referring to FIG. 1, a wireless communication apparatus 100 includes an interface 101, a data buffer 102, a central controller 103, a packet generator 104ƒ a wireless transmitter 106, a timing controller 107, an antenna 109, a wireless receiver 110, a packet analyzer 112, and an information storage unit 113.

The interface 101 exchanges various types of information with external apparatuses (e.g., a personal computer (not shown)) connected to the wireless communication apparatus 100.

The data buffer 102 is used to temporarily store data that has been transmitted from an apparatus connected via the interface 101 or data that has been received via a wireless transmission path and that is to be transmitted via the interface 101.

The central controller 103 unitarily manages sequences of transmission and reception by the wireless communication apparatus 100 and access to the transmission path. For example, based on CSMA, the central controller 103 causes a backoff timer to operate during a random period while monitoring the status of the transmission path, and acquires a transmission right when transmission signals are absent during this period.

The information storage unit 113 stores instructions for executing sequences executed by the central controller 103, such as access control sequences, information obtained by analyzing received packets, etc.

Figure 5:
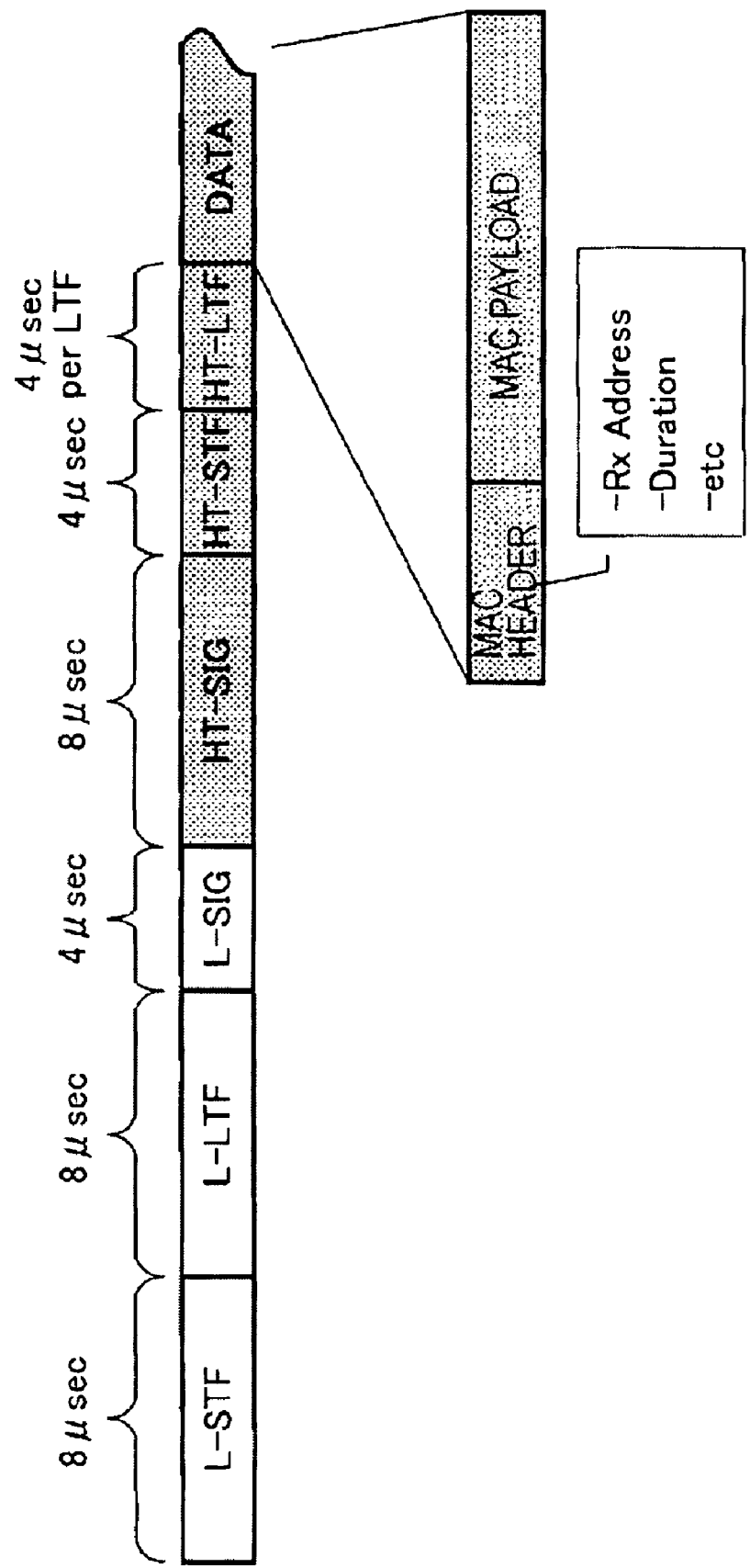
FIG. 5 is a diagram showing the format of an HT packet in the MM mode.

The packet generator 104 generates packet signals that are to be transmitted from the wireless communication apparatus 100 to other communication stations. In this embodiment, in accordance with whether the wireless communication apparatus 100 operates in the legacy mode or the MM mode, the packet generator 104 generates packets having either the format shown in FIG. 4 or the format shown in FIG. 5. In the MAC layer of a communication protocol, a MAC header is attached to a payload to form a MAC frame. Furthermore, in the PHY layer, a PHY header is attached to form a final structure of the packet to be transmitted. Furthermore, the packet analyzer 112 analyzes packet, signals received from other communication stations. Furthermore, the packet analyzer 112 executes a parity check on the header of the packet, determines a packet type, and so forth. These points will be described later in detail.

The central controller 103 executes processing corresponding to layers above the MAC layer in the communication protocol in cooperation with the packet generator 104 and the packet analyzer 112. On the other hand, each of the wireless transmitter 106 and the wireless receiver 110 corresponds to the RF layer and the PHY layer.

The wireless transmitter 106 transmits packet signals by wireless according to a predetermined modulation method and transmission rate. More specifically, the wireless transmitter 106 includes a modulator that modulates transmission signals by OFDM, a D/A converter that converts digital transmission signals into analog signals, an up-converter that up-converts the frequency of the analog transmission signals, a power amp (PA) that amplifies the power of the up-converted, transmission signals, and so forth (none of these components is shown). The wireless transmitter 106 executes wireless transmission at a predetermined transmission rate.

The wireless receiver 110 receives packet signals transmitted by wireless from other communication stations. More specifically, the wireless receiver 110 includes a low-noise amp (LNA) that amplifies the voltages of wireless signals received from other communication stations via the antenna 109, a down-converter that down-converts the frequency of the received signals having the amplified voltages, an automatic gain controller (AGC), an A/D converter that converts received analog signals into digital signals, a modulator that acquires synchronization, estimates a channel, and decodes the signals by OFDM or the like, and so forth (none of these components is shown).

The antenna 109 transmits signals addressed to other wireless communication apparatuses on a predetermined frequency channel by wireless, or collects signals transmitted from other wireless communication apparatuses. In this embodiment, only one antenna is provided, so that transmission and reception are not allowed simultaneously.

When the wireless communication apparatus 100 operates according to the legacy standard IEEE 802.11a/g, the wireless transmitter 106 and the wireless receiver 110 transmits and receives packets according to a modulation method and transmission rate according to the IEEE 802.11a/g. On the other hand, when the wireless communication apparatus 100 operates according to the IEEE 802.11n, the wireless transmitter 106 and the wireless receiver 110 can transmit and receive packets with the modulation method and transmission rate according to the IEEE 802.11a/g, and also with a modulation method and transmission rate specific to the IEEE 802.11n (i.e., not supported by the IEEE 802.11a/g). In the latter case, i.e., when the wireless communication apparatus 100 operates in the MM mode, the header of a packet is composed of a legacy preamble having the same format as the preamble according to the IEEE 802.11a/g followed by an HT preamble having the format specific to the IEEE 802.11n (refer to FIG. 5). The legacy preamble is transmitted and received at a transmission rate supported by the IEEE 802.11a/g. On the other hand, the HT preamble is transmitted and received, at a transmission rate specific to the IEEE 802.11n.

The timing controller 107 controls timing of transmission and reception of wireless signals. For example, the timing controller 107 controls timing of transmission packets of the wireless communication apparatus 100, timing of transmission (inter-frame spacing (IFS) or backoff) of packets based on RTS/CTS (RTS packets, CTS packets, data packets, ACK packets, etc.), and setting of NAV at reception of packets addressed to other communication stations.

The RTS/CTS is an approach for solving the problem of hidden terminals. More specifically, in a procedure of RTS/CTS, a terminal at a source of data transmission sends a request to send (RTS) packet, and starts data transmission in response to reception of a clear to send (CTS) packet, from at terminal at a destination of data transmission. Upon receiving at least one of RTS and CTS, a hidden terminal sets a transmission refraining period corresponding to an expected duration of data transmission based on the RTS/CTS procedure, thereby avoiding collision. A terminal that is hidden to a transmitting station avoids collision with data packets by receiving a CTS, setting a NAV, and refraining from transmission. A terminal that is hidden to a receiving station avoids collision with ACK packets by receiving an RTS, setting a NAV, and refraining from transmission.

The expected duration of data transmission based on the RTS/CTS procedure is specified in a DURATION field in the MAC header. However, in the case of a packet having the HT format shown in FIG. 5, a legacy terminal is not able to decode the MAC header following the legacy preamble. Thus, in the RATE field in the L-SIG field, an HT terminal operating in the MM mode specifies a bit sequence representing 6 Mbps, which is supported by legacy terminals. Furthermore, in the LENGTH field, the HT terminal specifies an appropriate network allocation vector (NAV) instead of an actual data length. That is, packet-length information is spoofed in accordance with the transmission rate so that the value obtained by dividing the packet length by the transmission rate becomes equal to the duration during which communications are to be refrained.

Upon receiving an MM packet, a legacy terminal divides the spoofed packet length by the transmission rate on the basis of the L-SIG field of the MM packet, sets a NAV for a duration determined by the division, and refrains from transmission during this period. Thus, collision with MM packets can be avoided, so that the packet exchanging sequence can foe maintained. Similarly to the legacy terminal, in addition to using the duration information in the MAC header transmitted in the HT format, an HT terminal calculates a period of the NAV on the basis of the description in the L-SIG field, and refrains from transmission during this period, so that the packet exchanging sequence can be maintained.

However, in the L-SIG, i.e., the SIGNAL field describing information such as the data transmission rate and data length in the legacy preamble, only one bit is provided for error detection. Thus, communications are susceptible to parity errors since errors that occur at an even number of bits are not detected.

Even when an error is included in the L-SIG field, it is possible that the terminal fails to detect the error with the parity check alone, so that a NAV can be set for a wrong period that is calculated on the basis of the incorrect RATE information and Length information. At this time, when the terminal refrains from transmission more than necessary, the efficiency of communications is reduced.

In the case of an HT packet, even when a parity error occurs in the L-SIG field, in some cases, it is possible to discard ail the received data in the field and to recover the correct communication sequence on the basis of the succeeding HT-SIG field or MAC header. However, errors that occur at an even number of bits are not detected, such a chance of recovery is missed, so that a receiving operation could be executed inappropriately according to the incorrect description in the L-SIG field.

Thus, in this embodiment, a wireless communication apparatus operating as an HT terminal detects whether the description in the L-SIG is compliant in addition to performing an ordinary parity check. When the description in the L-SIG is not compliant, even when no parity error is detected, information read from the L-SIG is considered as invalid and is discarded. This serves to improve the accuracy of error detection in the L-SIG. Now, types of information that is considered as not compliant in the L-SIG field will be described.

(1-1) Length

As shown in FIG. 6, the LENGTH field in the L-SIG field has a length of 12 bits, so that the LENGTH field can take on a value up to a maximum of 4,096 bytes. On the other hand, according to the 8802-11:1999-E-Revision of ANSI/IEEE Std 802.11 Section 6.2.1.1.2 Semantics of the service primitive (page 30), the maximum length of MSDU is 2,304 bytes. Together with the MAC header and a security field, the maximum data length is 2,346 bytes. Thus, when the LENGTH field takes on a value greater than 2,346 bytes, it can be estimated that an error is included in LENGTH, i.e., in the L-SIG field.

(1-2) Rate

According to the IEEE Std 802.11a-1999 Section 17.3.4.1 Data rate (RATE) (page 15), eight, transmission rates are supported, namely, 6 Mbps, 9 Mbps, 12 Mbps, 18 Mbps, 24 Mbps, 36 Mbps, 48 Mbps, and 54 Mbps. Furthermore, in the RATE field having a length of four bits, a transmission rate is specified using one of the following bit sequences.

| RATE [Mbps] | Bit Sequence |
| --- | --- |
| 6 | 1101 |
| 9 | 1111 |
| 12 | 0101 |
| 18 | 0111 |
| 24 | 1001 |
| 36 | 1011 |
| 48 | 0001 |
| 54 | 0011 |

Thus, in a packet compliant with the IEEE 802.11a, when a bit sequence other than the bit sequences shown in the above table appears in the RATS field in the L-SIG, it can be estimated that an error is included in RATE, i.e., in the L-SIG field.

(1-3) Tail

The six bits of the TAIL field in the L-SIG field are supposed to take on a value of "000000". Thus, when a value other than "000000" is written in the TAIL field, it can be estimated that an error is included in TAIL, i.e., in the L-SIG field.

Obviously, the information described above can also be used to check the validity of the SIGNAL field when data communications are carried out according to the IEEE; 802.11a/g among legacy terminals as well as HT terminals.

Furthermore, in the wireless communication apparatus according to this embodiment, a certain rule is defined so as not to foe incompliant with the IEEE 802.11a regarding the description of the L-SIG field in the preamble, and when an HT packet is received, it is checked whether the description in the SIG-field is compliant with this rule. When information not compliant with the rule is described in the L-SIG field, even when no parity error is detected, the information read from the L-SIG field is considered as invalid and is not used. Hereinafter, rules that can be imposed on the description in the L-SIG field according to the IEEE 802.11n so that it is possible to check errors in the L-SIG field will be described.

(2-1) Rate

In the preamble of an MM packet according to the IEEE 802.11n, the L-SIG field is used to spoof the transmission rate (RATE) and the packet length (LENGTH) to legacy terminals. More specifically, in the FATE field of the L-SIG field, a bit sequence representing 6 Mbps, which is supported by legacy terminals, is set. Furthermore, in the LENGTH field, an appropriate value of NAV is set instead of an actual data length. That is, as described earlier, the packet length information is spoofed in accordance with the transmission rate so that the value obtained by dividing the value of the LENGTH field by the value of the RATE field becomes equal to the duration corresponding to a transmission waiting period.

For example, EWC_PHY_spec_V127.pdf defines a rule regarding the L-SIG field of packets exchanged between HT terminals compliant with the IEEE 802.11n. In this document, 3.5.4 The Legacy Signal Field (page 20) dictates that "1101" representing 6 Mbps be set in the RATE field of the L-SIG. Thus, when a bit sequence other than "1101" is set in the RATE field of the L-SIG in an MM packet, it can be estimated that an error is included in the field.

(2-2) Length

The legacy standard. IEEE 802.11a defines the number of bytes that, can be transmitted per one OFDM symbol regarding each transmission rate (RATE) that is supported. This can be interpreted that the number of bytes that can be transmitted in each unit time is uniquely determined according to the transmission rate. For example, when the transmission rate is 6 Mbps, the number of bytes that can be transmitted per OFDM symbol is 3 bytes.

On the other hand, as described earlier, the enhanced standard IEEE 802.11n defines that the RATE information in the L-SIG of the legacy preamble of an MM packet represents 6 Mbps. In this case, even when the packet length is not a multiple of 3 bytes, i.e., even when the packet length is 3N+1 bytes or 3N+2 bytes (where N is an integer greater than or equal to 0), the portion exceeding 3N bytes is transmitted using one OFDM symbol. Thus, within the range of packet length from 3N+1 bytes to 3 (N+1) bytes, the number of OFDM symbols used for transmission is the same N+1, so that the duration corresponding to the value obtained by dividing the value of the LENGTH field by the value of the RATE field is the same.

With this property, even though the IEEE 802.11n defines that the LENGTH field is represented by a multiple of 3 bytes, incompatibility with the legacy IEEE 802.11a/g does not arise. An HT terminal at a receiving end checks whether the value in the LENGTH field is a multiple of 3 bytes, and estimates that an error is included in the field if the value is not a multiple of 3 bytes. Setting a multiple of 3 bytes in the LENGTH field corresponds to writing the number of bytes that can be transmitted per unit time in the LENGTH field. Obviously, a rule may be shared between transmitting and receiving terminals such that the LENGTH field is represented by a value corresponding to a multiple+1 or a multiple+2. This also allows checking whether an error is included by checking the value in the LENGTH field.

As described above, in the wireless communication apparatus 100 according to this embodiment, regarding the values in the RATE field and the LENGTH field in the L-SIG, compatibility with the legacy standard IEEE802.11a or a rule that is newly defined in the enhanced standard IEEE 802.11n is checked. This serves to detect errors that are not detected by a parity check.

Figure 2A:
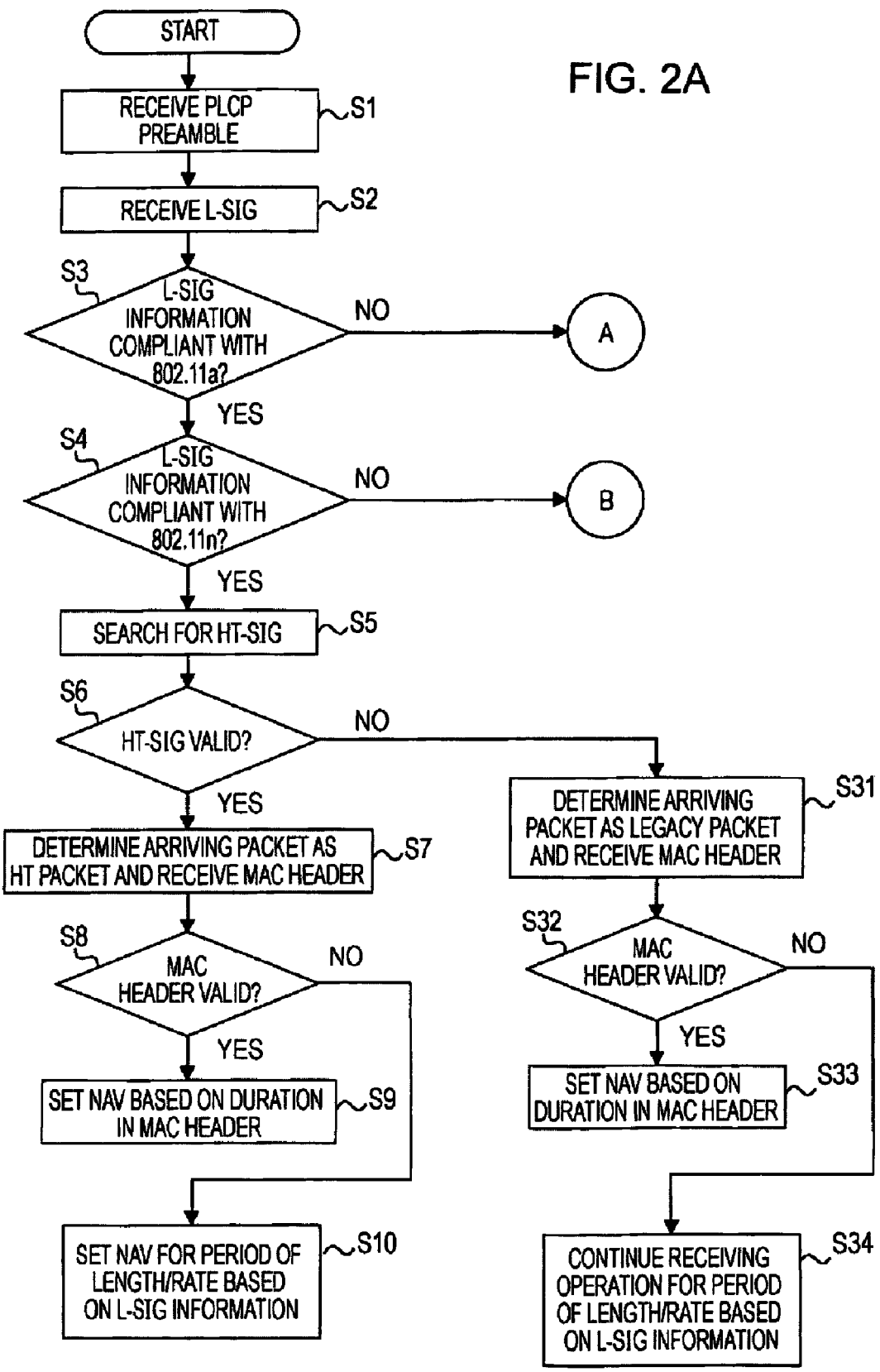
FIG. 2A is a flowchart showing a procedure by which an HT terminal compliant with the IEEE 802.11n receives a packet while checking errors in an L-SIG field.
Figure 2C:
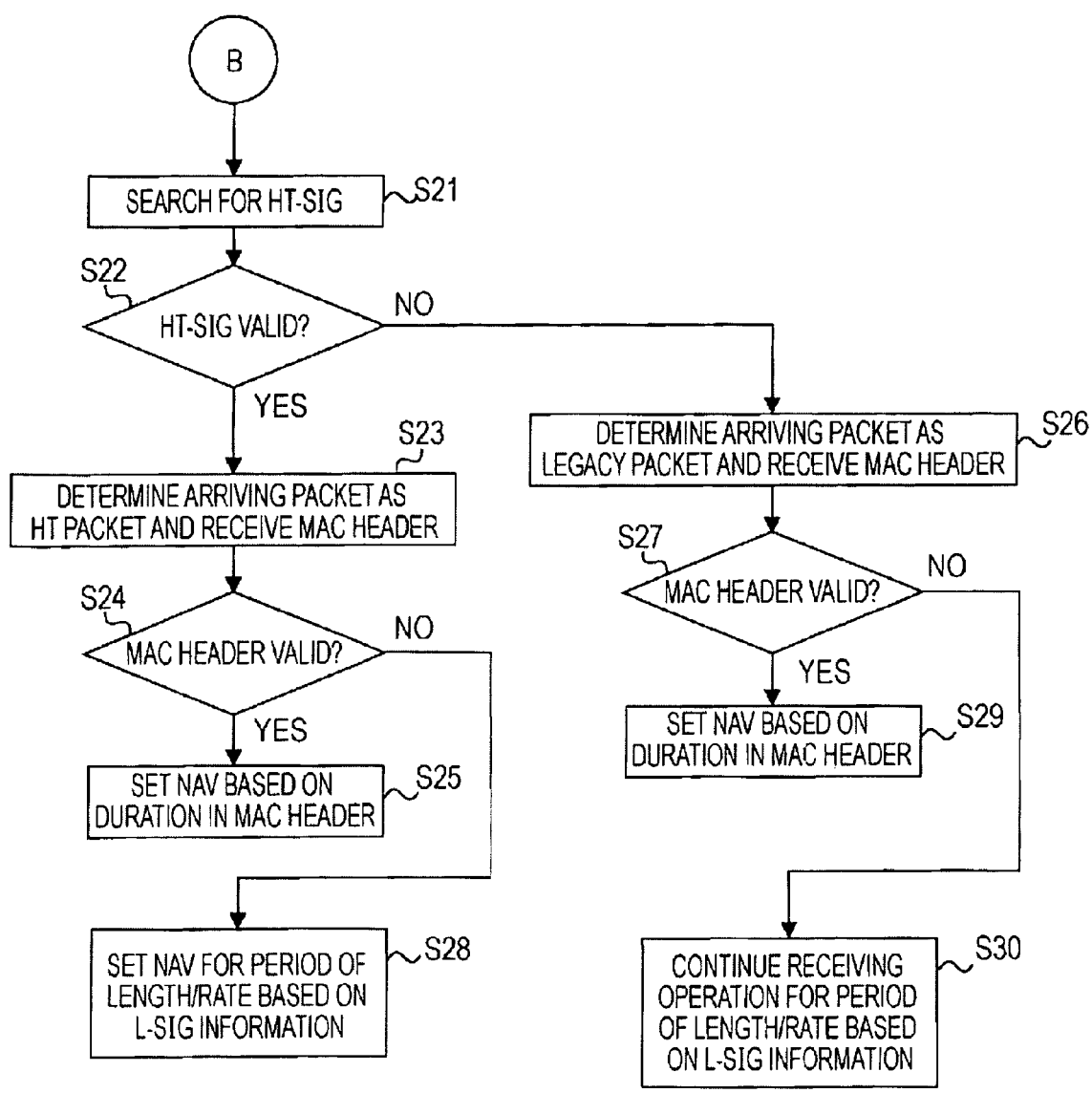
FIG. 2C is a flowchart showing a procedure by which an HT terminal compliant with the IEEE 802.11n receives a packet while checking errors in an L-SIG field.

FIGS. 2A to 2C show flowcharts of a procedure for receiving packets while checking errors in the L-SIG fields using the fields (1-1) to (1-3) and (2-1) to (2-2) described above when the wireless communication apparatus 100 operates in the MM mode as an HT terminal compliant with the IEEE 802.11n. It is assumed herein that it is unknown to the wireless communication apparatus 100 whether arriving packets are legacy packets (refer to FIG. 4) or HT packets (refer to FIG. 5) and that arriving packets are not addressed to the wireless communication apparatus 100.

When a packet arrives at the wireless communication apparatus 100 and the L-STF at the beginning of the packet is received to discover the packet, synchronization acquisition, equalization, and so forth are executed using the L-STF and the succeeding L-LTF (step S1).

Then, upon receiving the L-SIG (step S2), a parity check is executed using the parity bit. When no parity error is detected in the L-SIG field, it is checked whether the content of the L-SIG field is compliant with the legacy standard IEEE 802.11a (step S3). More specifically, it is checked whether the value in the LENGTH field does not exceed 2,346 bytes, whether the content of the RATE field is one of the eight bit sequences defined in the IEEE 802.11a, and whether the content of the TAIL field is a sequence of 0s.

When it is confirmed that the content of the L-SIG is compliant with the legacy standard (Yes in step S3), it is further checked whether the content of the L-SIG is compliant with the enhanced standard IEEE 802.11n (step S4). More specifically, it is checked whether the bit sequence in the RATE field is "1101" representing 6 Mbps, and whether the value in the LENGTH field is a multiple of 3 bytes (assuming that, it is dictated to place a multiple of 3 bytes in the LENGTH field) or any other value compliant with a rule shared between a sender and a receiver, such as a multiple of 3+1 or a multiple of 3+2.

Figure 8A:
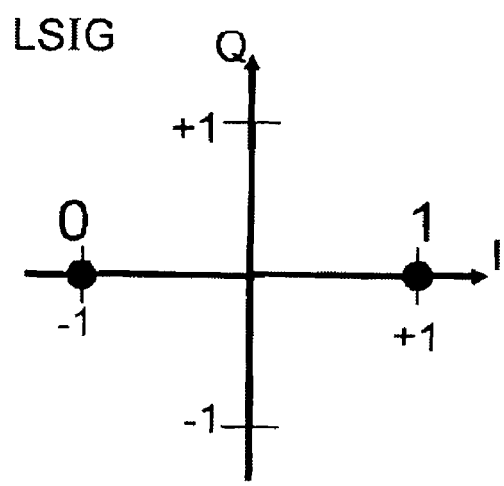
FIGS. 8A and 8E are diagrams for explaining a scheme in which an HT-SIG field is BPSK-modulated in a phase space that is rotated by 90 degrees relative to a phase space for an L-SIG field.
Figure 8B:
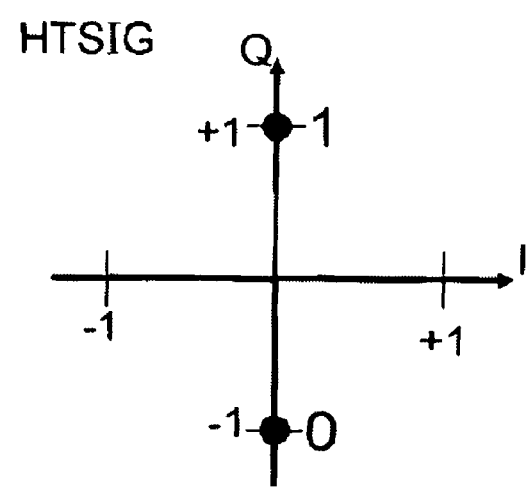
Figure 9:
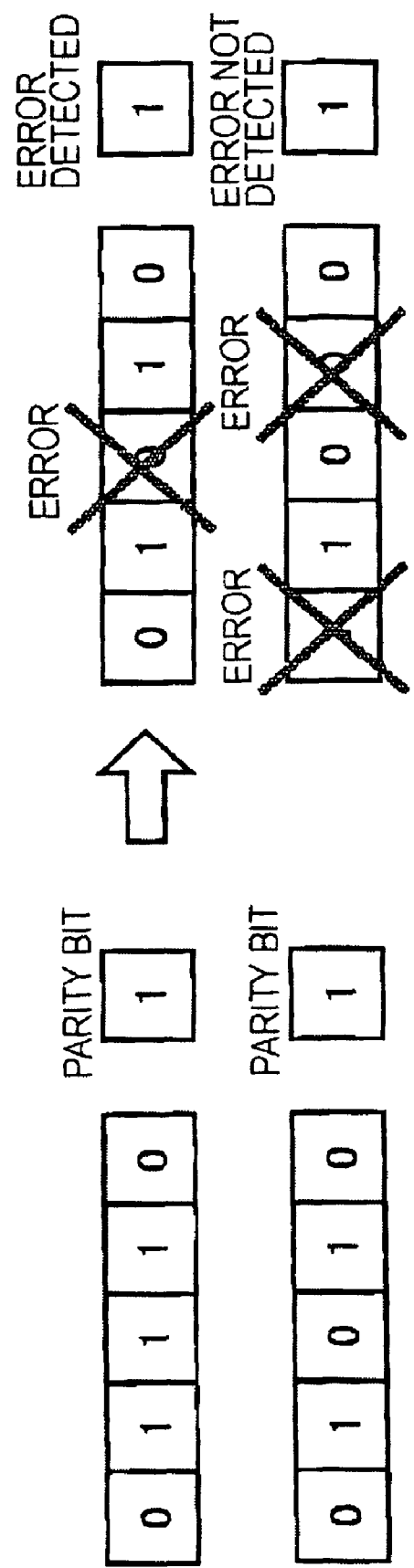
FIG. 9 is a diagram for explaining errors that occur at an even number of bits and that are not detected by a parity check.

When it is confirmed that the L-SIG information is compliant with the enhanced standard (Yes in step S4), it is checked whether the legacy preamble is followed by an HT preamble. More specifically, since the HT-SIG field at the beginning of an HT preamble in BPSK-modulated in a phase space that is rotated by 90 degrees relative to a phase space for the L-SIG field (described earlier with reference to FIGS. 8A and 8B), received OFDM symbols corresponding to the HT-SIG are searched for in the phase space rotated by 90 degrees (step S3). Then, it is checked whether valid HT-SIG information has been received (step S6).

When valid HT-SIG information has been received (Yes in step S6), it is determined that the arriving packet, is an HT packet. Then, a MAC header is received (step S1), and it is further checked whether a valid MAC header has been received (step S8).

When a valid MAC header has been received (Yes in step S8), the MAC header is decoded. When it is recognized that the packet is not addressed to the own wireless communication apparatus 100, a NAY is set for a duration described in the MAC header, and transmission is refrained during a corresponding period (step S9).

When a valid MAC header has not been received (No in step S8), on the basis of the L-SIG information in the legacy preamble, a NAV is set for a transmission waiting-period determined by dividing the value of the LENGTH field by the value of the RATE field, and transmission is refrained during this period (step S10).

When the L-SIG information is compliant with both the legacy standard and the enhanced standard bat valid HT-SIG information is not received subsequently (No in step S6), it is determined that the arriving packet is a legacy packet. In this case, a MAC header is received at a transmission rate corresponding to the RATE information described in the L-SIG (step S31), and it is further checked whether a valid MAC header has been received (step S32).

When a valid MAC header has been received (Yes in step S32), the MAC header is decoded. When it is recognized that the packet is not addressed to the own wireless communication apparatus 100, a NAV is set for a duration described in the MAC header, and transmission is refrained during a corresponding period (step S33).

When a valid MAC header has not been received (No in step S32), on the basis of the L-SIG information in the legacy preamble, the receiving operation is continued, during a transmission waiting period determined by dividing the value of the LENGTH field by the value of the HATE field (CCABusy) (step S34).

When the content of the L-SIG is compliant with the legacy standard but is not compliant with the enhanced standard (No in step S4), it is checked whether the legacy preamble is followed by an HT preamble. More specifically, received OFDM symbols corresponding to the HT-SIG are searched for in the phase space rotated by 90 degrees (step S21). Then, it is checked whether valid HT-SIG information has been received (step S22).

When valid HT-SIG information has been received (Yes in step S22), it is determined that the arriving packet is an HT packet and that an error is included in the L-SIG. Then, a MAC header is received (step S23), and it is further checked whether a valid MAC header has been received (step S24).

When a valid MAC header has been received (Yes in step S24), the MAC header is decoded. When it is recognized that the packet is not addressed, to the own wireless communication apparatus 100, a NAV is set for a duration described in the MAC header, and transmission is refrained during a corresponding period (step S25).

When a valid MAC header has not been received (No in step S24), on the basis of the L-SIG information in the legacy preamble, the receiving operation is continued during a transmission waiting period determined by dividing the value of the LENGTH field by the value of the RATE field (CCABusy) (step S28).

When the L-SIG is not compliant with the enhanced standard (No in step S4), and valid HT-SIG information is not received (No in step S22) even when succeeding HT-SIG information is searched for (step S21), it is determined that the arriving packet is a legacy packet. In this case, a MAC header is received at a transmission rate corresponding to the RATE information described in the L-SIG (step S26) r and it is further checked whether a valid MAC header has been received, (step S27).

When a valid MAC header has been received (Yes in step S27), the MAC header is decoded. When it is recognized that the packet is not addressed to the own wireless communication apparatus 100, a NAV is set for a duration described in the MAC header, and transmission is refrained during a corresponding period (step S29).

When a valid MAC header has not been received (No in step S27), on the basis of the L-SIG information in the legacy preamble, the receiving operation is continued during a transmission waiting period determined by dividing the value of the LENGTH field by the value of the RATE field (CCABusy) (step S30).

When the content of the L-SIG is not compliant with the legacy standard (No in step S3), it is further checked whether the legacy preamble is followed by an HT preamble. More specifically, received OFDM symbols corresponding to the HT-SIG are searched for in the phase space rotated by 90 degrees (step S11). Then, it is checked whether valid HT-SIG information has been received, (step S12).

When valid HT-SIG information has been received (Yes in step S12), it is determined, that the arriving packet is an HT packet and that an error in included in the L-SIG. Then, a MAC header is received according to the HT format (step S13), and it is further checked whether a valid MAC header has been received (step S14).

When a valid MAC header has been received (Yes in step S14), the MAC header is decoded. When it is recognized that the packet is not addressed to the own wireless communication apparatus 100, a NAV is set for a duration described in the MAC header, and transmission is refrained during a corresponding period (step S15).

When a valid MAC header has not been received (No in step S14), on the basis of the L-SIG information in the legacy preamble, the receiving operation is continued during a transmission waiting period determined by dividing the value of the LENGTH field by the value of the RATE field (CCABusy) (step S16).

When the L-SIG is not compliant with the legacy standard (No in step S3), and valid HT-SIG information is not received (No in step S12) even when succeeding HT-SIG information is searched for (step S11), it is determined that an error is included in the legacy preamble of the arriving packet. In this case, it is not possible to obtain an appropriate transmission waiting period by dividing the value of the LENGTH field by the value of the RATE field. Thus, the wireless communication apparatus 100 enters a carrier sensing state (step S17), and waits for occurrence of data to transmit in the own wireless communication apparatus 100 while detecting a timing for accessing the transmission path.

A feature of the packet receiving procedure shown in FIGS. 2A to 2C are characteristic is that compliance with the legacy standard IEEE 802.11a and compliance with the enhanced standard IEEE 802.11n are checked in steps S3 and S4 regarding the values of the RATE field and the LENGTH field in the L-SIG. This serves to find errors in the L-SIG that are not detected by parity checking.

For example, when a received packet is an HT packet and a valid MAC header is not received by the wireless communication apparatus 100, in step S10, a NAV is set for a transmission waiting period determined by dividing the value of the LENGTH field by the value of the RATE field on the basis of the L-SIG information instead of the duration information in the MAC header. This serves to reduce the possibility of the presence of errors in the L-SIG field, so that a transmission waiting period can be determined more appropriately.

Another feature of the packet receiving procedure shown in FIGS. 2A to 2C is that even when the content of the L-SIG field is not compliant with the legacy standard IEEE 802.11a or the enhanced standard IEEE 802.11n, it is attempted to receive HT-SIG succeeding the L-SIG, it is further checked whether the arriving packet can be received according to the HT format, and the arriving packet is received as an HT packet when possible.

Figure 3A:
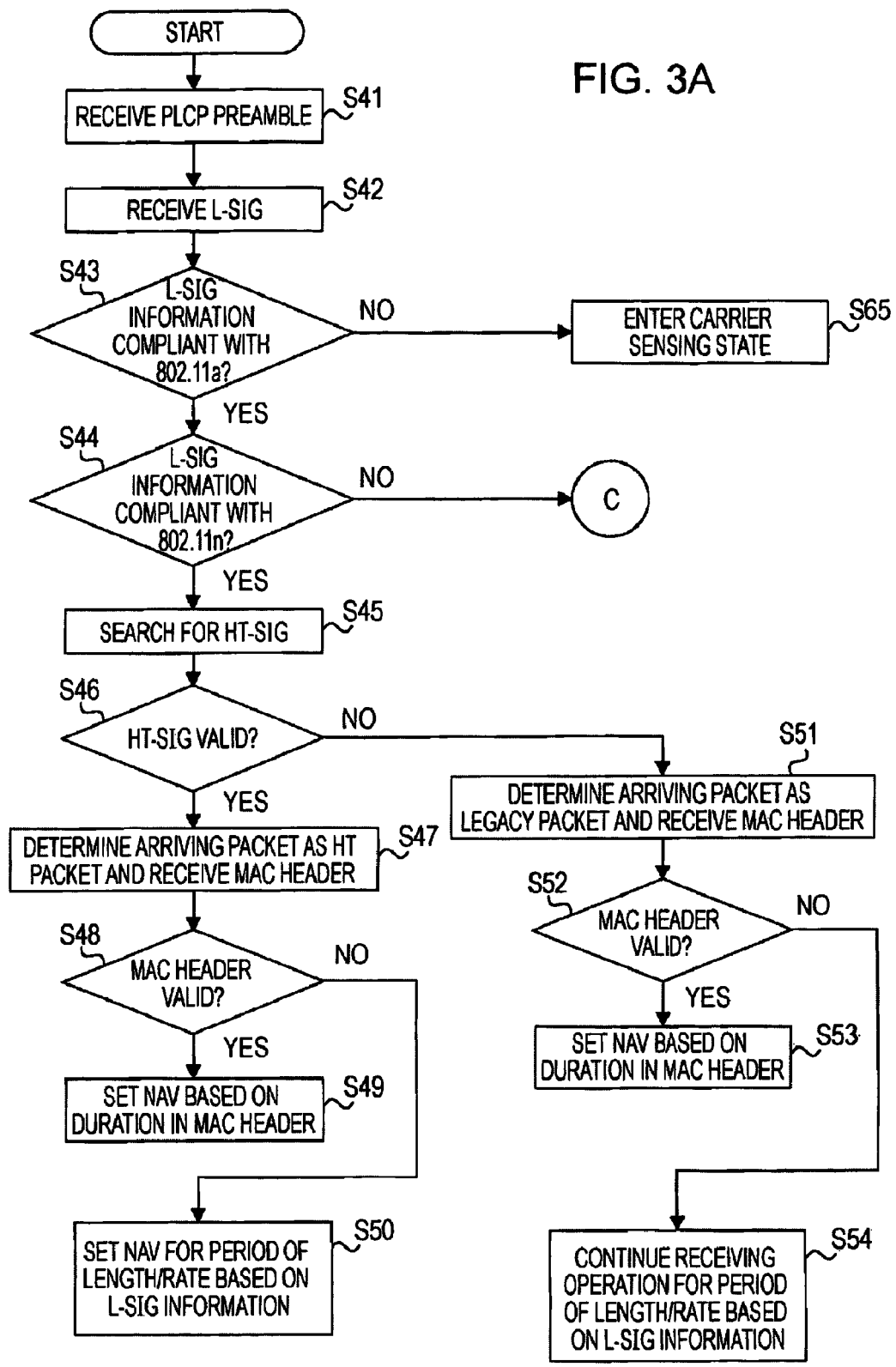
FIG. 3A is a flowchart showing a procedure by which an HT terminal compliant with the IEEE 802.11n receives a packet while checking errors in an L-SIG field.
Figure 3B:
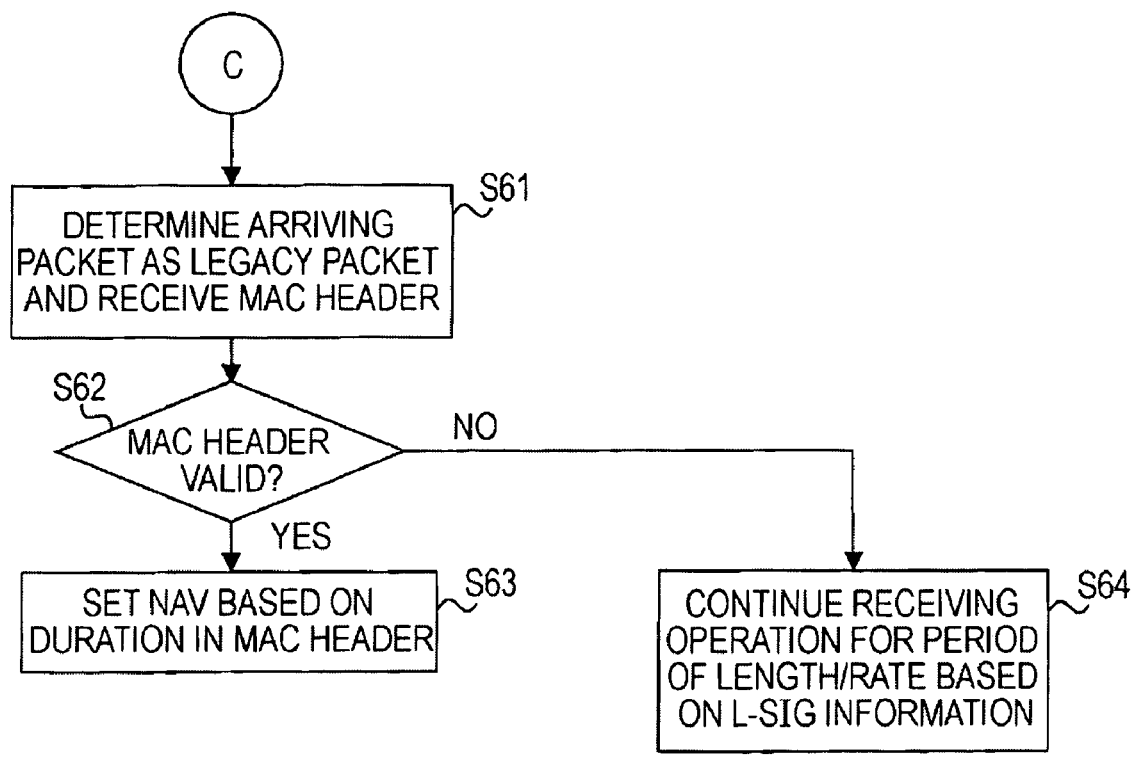
FIG. 3B is a flowchart showing a procedure by which an HT terminal compliant with the IEEE 802.11n receives a packet while checking errors in an L-SIG field.

Alternatively, in a modification of the embodiment described above, when the L-SIG field of a received packet is not compliant with the legacy standard IEEE 802.11a or the enhanced standard IEEE 802.11n, it is assumed that the packet includes an error and is not reliable, and the packet is handled as a legacy packet. FIGS. 3A and 3B show flowcharts of a packet receiving procedure for the wireless communication apparatus 100 in this case. Similarly to the embodiment described above, the wireless communication apparatus 100 operates in the MM mode as an HT terminal compliant with the IEEE 802.11n, and it is assumed that arriving packets are not addressed to the wireless communication apparatus 100 and that it is unknown to the wireless communication apparatus 100 whether arriving packets are legacy packets or HT packets.

When a packet arrives at the wireless communication apparatus 100 and the L-STF at the beginning of the packet is received to discover the packet, synchronization acquisition, equalization, and so forth are executed using the L-STF and the succeeding L-LTF (step S41).

Then, upon receiving the L-SIG (step S42), a parity check is executed using the parity bit. When no parity error is detected in the L-SIG field, it is checked, whether the content of the L-SIG field is compliant with the legacy standard IEEE 802.11a (step S43). More specifically, it is checked whether the value in the LENGTH field does not exceed 2,346 bytes, whether the content of the RATE field is one of the eight bit sequences defined in the IEEE 802.11a, and whether the content of the TAIL field is a sequence of 0s.

When it is confirmed that the content of the L-SIG is compliant with the legacy standard (Yes in step 343), it is further checked whether the content of the L-SIG is compliant with the enhanced standard IEEE 802.11n (step S44). More specifically, it is checked whether the bit sequence in the RATE field is "1101" representing 6 Mbps, and whether the value in the LENGTH field is a multiple of 3 bytes (assuming that it is dictated to place a multiple of 3 bytes in the LENGTH field).

When it is confirmed that the L-SIG information is compliant with the enhanced standard (Yes in step S44), it is checked whether the legacy preamble is followed by an HT preamble. More specifically, since the HT-SIG field at the beginning of an HT preamble is BPSK-modulated in a phase space that is rotated by 90 degrees relative to a phase space for the L-SIG field, (described earlier with reference to FIGS. 8A and 8B), received OFDM symbols corresponding to the HT-SIG are searched for in the phase space rotated by 90 degrees (step S45). Then, it is checked whether valid HT-SIG information has been received (step S46).

When valid HT-SIG information has been received (Yes in step S46), it is determined that the arriving packet is an HT packet. Then, a MAC header is received (step 347) according to the HT format, and it is further checked whether a valid MAC header has been received (step S48).

When a valid MAC header has been received (Yes in step S48), the MAC header is decoded. When it is recognized that the packet is not addressed to the own wireless communication apparatus 100, a NAV is set for a duration described in the MAC header, and transmission is refrained during a corresponding period (step S49).

When a valid MAC header has not been received (No in step S48), on the basis of the L-SIG information in the legacy preamble, a NAV is set for a transmission waiting period determined by dividing the value of the LENGTH field by the value of the RATE field, and transmission is refrained during this period (step S50).

When the L-SIG information is compliant with both the legacy standard and the enhanced standard but valid HT-SIG information is not received subsequently (No in step S46), it is determined that the arriving packet is a legacy packet. In this case, a MAC header is received at a transmission rate corresponding to the RATE information described in the L-SIG (step S51), and it is further checked whether a valid MAC header has been received, (step 352).

When a valid MAC header has been received (Yes in step S52), the MAC header is decoded. When it is recognized that the packet is not addressed to the own wireless communication apparatus 100, a NAV is set for a duration described in the MAC header, and transmission is refrained during a corresponding period (step S53).

When a valid MAC header has not been received (No in step S52), on the basis of the L-SIG information in the legacy preamble, the receiving operation is continued during a transmission waiting period determined by dividing the value of the LENGTH field by the value of the RATS field (CCABusy) (step S34).

When the content of the L-SIG is compliant with the legacy standard but is not compliant with the enhanced standard (No in step S44), it is determined that the arriving packet is a legacy packet. In this case, a MAC header is received at a transmission rate corresponding to the RATE information described in the L-SIG (step S61), and it is further checked whether a valid MAC header has been received (step S62).

When a valid MAC header has been received (Yes in step S62), the MAC header is decoded. When it is recognized that the packet is not addressed to the own wireless communication apparatus 100, a NAY is set for a duration described in the MAC header, and transmission is refrained during a corresponding period (step S63).

When a valid MAC header has not been received (No in step 362), on the basis of the L-SIC information in the legacy preamble, the receiving operation is continued during a transmission waiting period determined by dividing the value of the LENGTH field by the value of the RATE field (CCABusy) (step S64).

When the content of the L-SIG is not compliant with the legacy standard (No in step S43), it is determined that an error is included in the legacy preamble of the arriving packet. In this case, it is not possible to obtain an appropriate transmission waiting period by dividing the value of the LENGTH field by the value of the RATE field. Thus, the wireless communication apparatus 100 enters a carrier sensing state (step S63), and waits for occurrence of data to transmit in the own wireless communication apparatus 100 while detecting a timing for accessing the transmission path.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system comprising:
   a first communication station configured to operate according to a first communication protocol; and
   a second communication station capable of operating according to both the first communication protocol and a second communication protocol;
   wherein when the second communication station transmits a packet according to the second communication protocol, at least a first signal field compliant with the first communication protocol and a second signal field compliant with the second communication protocol are attached to a header of the packet, the first signal field including a parity bit,
   wherein the first signal field includes a rate field and a length field representing a transmission rate and a packet length of the packet, and
   wherein when the second communication station receives a packet from another communication station, the second communication station performs a parity check on the first signal field of the packet, and when no parity error is detected, the second communication station further checks whether the rate field in the first signal field of the packet includes a bit sequence representing one predetermined specific value.

2. The wireless communication system according to claim 1,
   wherein the length field has a bit size sufficient to represent a value greater than or equal to a maximum packet length according to the first communication protocol, and
   wherein when the second communication station receives a packet from another communication station, the second communication station checks whether a value of the length field in the first signal field does not exceed the maximum packet length according to the first communication protocol.

3. The wireless communication system according to claim 1,
   wherein the first communication protocol defines a finite number of transmission rates, the rate field representing the transmission rate in the form of a bit sequence.

4. The wireless communication system according to claim 1,
   wherein when the second communication station receives a packet from another communication station, the second communication station checks whether the first signal field ends with a bit sequence of 0s.

5. The wireless communication system according to claim 1,
   wherein a rule specific to the second communication protocol is defined regarding content of the first signal field of a packet that is transmitted according to the second communication protocol, the rule being defined so as not to be incompatible with the first communication protocol, and wherein when the second communication station receives a packet from another communication station, the second communication station checks whether content of the first signal field is compliant with the rule specific to the second communication protocol.

6. The wireless communication system according to claim 5,
wherein the second communication protocol defines that a bit sequence representing a specific transmission rate be written in the RATE field in the first signal field, and
wherein when the second communication station receives a packet from another communication station, the second communication station checks whether the bit sequence representing the specific transmission rate is written in the rate field in the first signal field of the packet.

7. The wireless communication system according to claim 5,
wherein the first communication protocol defines a data length of data that can be transmitted per unit time at each transmission rate,
wherein the second communication protocol defines that a transmission waiting period of a neighboring station be represented by a value obtained by dividing a value of the length field by a value of the rate field in the first signal field, and that a value determined on the basis of the data length of data that can be transmitted per unit time at the transmission rate written in the rate field be written in the length field, and
wherein when the second communication station receives a packet from another communication station, the second communication station checks whether a value compliant with a rule shared between the second communication station and the another communication station is written in the length field in the first signal field of the packet.

8. A wireless communication apparatus that operates in a wireless communication environment in which a first communication protocol and a second communication protocol are used, the wireless communication apparatus comprising:
a transmitter configured to transmit a wireless signal;
a receiver configured to receive a wireless signal;
a packet generator configured to generate a packet that is to be transmitted, the packet generator providing a rate field and a length field representing a transmission rate and a packet length of the packet in a first signal field compliant with the first communication protocol;
a packet analyzer configured to analyze a packet that is received; and
a communication controller configured to control communications carried out by the transmitter and the receiver according to a result of analyzing the received packet by the packet analyzer;
wherein the packet generator attaches the first signal field and a second signal field compliant with the second communication protocol to a header of a packet that is transmitted according to the second communication protocol, the first signal field including a parity bit, and
wherein the packet analyzer performs a parity check on the first signal field of the received packet, and when no parity error is detected, the packet analyzer further checks whether the rate field in the first signal field of the packet includes a bit sequence representing one predetermined specific value.

9. The wireless communication apparatus according to claim 8,
wherein the length field has a hit size sufficient to represent a value greater than or equal to a maximum packet length according to the first communication protocol, and
wherein the packet analyzer checks whether a value of the length field in the first signal field of the received packet does not exceed the maximum packet length according to the first communication protocol.

10. The wireless communication apparatus according to claim 8,
wherein the first communication protocol defines a finite number of transmission rates, and the rate field representing the transmission rate in the form of a bit sequence.

11. The wireless communication apparatus according to claim 8,
wherein the packet analyzer checks whether the first signal field of the received packet ends with a bit-sequence of 0s.

12. The wireless communication apparatus according to claim 8,
wherein the second communication protocol defines a rule specific to the second communication protocol regarding content of the first signal field of a packet, the rule being defined so as not to be incompatible with the first communication protocol, and
wherein the packet analyzer checks whether content of the first signal field of the received packet is compliant with the rule specific to the second communication protocol.

13. The wireless communication apparatus according to claim 12,
wherein the rate field in the first signal field of a packet that is transmitted according to the second communication protocol including a bit sequence representing a specific transmission rate, and
wherein the packet analyzerchecks whether the bit sequence representing the specific transmission rate is written in the rate field in the first signal field of the received packet.

14. The wireless communication apparatus according to claim 12,
wherein the first communication protocol defines a data length of data that can be transmitted per unit time at each transmission rate,
wherein the packet generator represents a transmission waiting period of a neighboring station by a value obtained by dividing a value of the length field by a value of the rate field in the first signal field of a packet that is transmitted according to the second communication protocol, and writes in the length field a value determined on the basis of the data length of data that can be transmitted per unit time at the transmission rate written in the rate field, and
wherein the packet analyzer checks whether a value compliant with a rule shared between a transmitting communication station and a receiving communication station is written in the length field in the first signal field of the received packet.

15. The wireless communication apparatus according to claim 8,
wherein a packet that is transmitted according to the second communication protocol in the wireless communication environment includes a media access control (MAC) frame succeeding the second signal field, wherein the packet analyzer detects whether a valid second signal field exists after the first signal field of the received packet, and wherein the communication controller controls reception of a MAC frame according to either the first communication protocol or the second communication protocol in accordance with a result of checking the first signal field of the received packet and detecting whether a valid second signal field exists by the packet analyzer.

16. The wireless communication apparatus according to claim 15, wherein when the checking of the first signal field of the received packet by the packet analyzer fails or when the checking of the first signal field of the received packet by the packet analyzer fails and a valid second signal field is not received, the communication controller causes the transmitter and the receiver to enter a carrier detecting state.

17. The wireless communication apparatus according to claim 15, wherein a rule specific to the second communication protocol is defined regarding content of the first signal field of a packet that is transmitted according to the second communication protocol, the rule being defined so as not to be incompatible with the first communication protocol, and wherein when the content of the first signal field is not compliant with the rule specific to the second communication protocol as a result of checking the received packet by the packet analyzer, the communication controller controls reception of a MAC frame according to the first communication protocol.

18. The wireless communication apparatus according to claim 15, wherein when the checking of the first signal field of the received packet by the packet analyzer succeeds, the communication controller controls reception of a MAC frame according to the second communication protocol when a valid second signal field is received, and otherwise controls reception of a MAC frame according to the first communication protocol.

19. The wireless communication apparatus according to claim 15, wherein even when the checking of the first signal field of the received packet by the packet analyzer fails, the communication controlling means attempts to receive a second signal field, and controls reception of a MAC frame according to the second communication protocol when a valid second signal field is received.

20. The wireless communication apparatus according to claim 15, wherein a rule specific to the second communication protocol is defined regarding content of the first signal field of a packet that is transmitted according to the second communication protocol, the rule being defined so as not to be incompatible with the first communication protocol, and wherein even when the content of the first signal field is not compliant with the rule specific to the second communication protocol as a result of checking the received packet by the packet analyzer, the communication controlling means attempts to receive a second signal field, and controls reception of a MAC frame according to the second communication protocol when a valid second signal field is received.

21. The wireless communication apparatus according to any one of claims 18, 19, and 20, wherein a transmission waiting period of a neighboring station is represented by a value obtained by dividing a value of the length field by a value of the rate field in the first signal field of a packet that is transmitted according to the second communication protocol, and wherein even when a valid second signal field is received, the communication controller sets the transmission waiting period on the basis of the value obtained by dividing the value of the length field by the value of the rate field in the first signal field when a valid MAC frame is not received subsequently.

22. A wireless communication method for carrying out communications in a wireless communication environment in which a first communication protocol and a second communication protocol are used, the wireless communication method comprising the steps of:

generating a packet having a header to which a first signal field according to the first communication protocol is attached, the first signal field including a parity bit, and transmitting the packet according to the first communication protocol;

generating a packet having a header to which a first signal field according to the first communication protocol and a second signal field according to the second communication protocol are attached, the first signal field including a parity bit, and transmitting the packet according to the second communication protocol;

receiving a packet from another communication station;

performing a parity check on the first signal field of the received packet, and when no parity error is detected, further checking whether a rate field in the first signal field of the packet includes a bit sequence representing one predetermined specific value;

detecting whether a valid second signal field exists subsequently to the first signal field of the received packet; and receiving a frame subsequent to a signal field according to either the first communication protocol or the second communication protocol in accordance with a result of checking the first signal field of the received packet or a result of detecting whether a valid second signal field exists.

23. A non-transitory computer-readable recording medium which stores a computer program written in a computer-readable form so that a computer is allowed to execute processing for carrying out communications in a wireless communication environment in which a first communication protocol and a second communication protocol are used, the computer program allowing the computer to execute the steps of:

generating a packet having a header to which a first signal field according to the first communication protocol is attached, the first signal field including a parity bit, and transmitting the packet according to the first communication protocol;

generating a packet having a header to which a first signal field according to the first communication protocol and a second signal field according to the second communication protocol are attached, the first signal field including a parity bit, and transmitting the packet according to the second communication protocol;

receiving a packet from another communication station;

performing a parity check on the first signal field of the received packet, and when no parity error is detected, further checking whether a rate field in the first signal field of the packet includes a bit sequence representing one predetermined specific value;

detecting whether a valid second signal field exists subsequently to the first signal field of the received packet; and receiving a frame subsequent to a signal field according to either the first communication protocol or the second communication protocol in accordance with a result of checking the first signal field of the received packet or a result of detecting whether a valid second signal field exists.

24. A wireless communication apparatus that operates in a wireless communication environment in which a first communication protocol and a second communication protocol are used, the wireless communication apparatus comprising:

a transmitter configured to transmit a wireless signal;

a receiver configured to receive a wireless signal;

a packet generator configured to generate a packet that is to be transmitted;

a packet analyzer configured to analyze a packet that is received; and a communication controller configured to control communications carried out by the transmitter and the receiver according to a result of analyzing the received packet by the packet analyzer;

wherein the packet generator attaches a first signal field compliant with the first communication protocol and a second signal field compliant with the second communication protocol to a header of a packet that is transmitted according to the second communication protocol, the first signal field including a parity bit, and wherein the packet analyzer performs a parity check on the first signal field of the received packet, and when no parity error is detected, the packet analyzer further checks whether a rate field in the first signal field of the packet includes a bit sequence representing one predetermined specific value.

* * * * *